S. PARKS, Jr.
Machine for Making Lead Pipe.

No. 5,852.  Patented Oct. 17, 1848.

UNITED STATES PATENT OFFICE.

STEPHEN PARKS, JR., OF BROOKLYN, NEW YORK.

ARCHIMEDEAN LEAD-PIPE MACHINE.

Specification of Letters Patent No. 5,852, dated October 17, 1848.

*To all whom it may concern:*

Be it known that I, STEPHEN PARKS, Jr., of Brooklyn, in the county of Kings and State of New York, have invented a new and Improved Machine for Manufacturing Pipe of Metal while in a Semifluid State, which I denominate "Parks's Archimedean Pipe-Machine;" and I do hereby declare the following to be a full, clear, and exact description thereof, reference being had to the accompanying drawings, making a part of this specification, in which—

Figure 1:
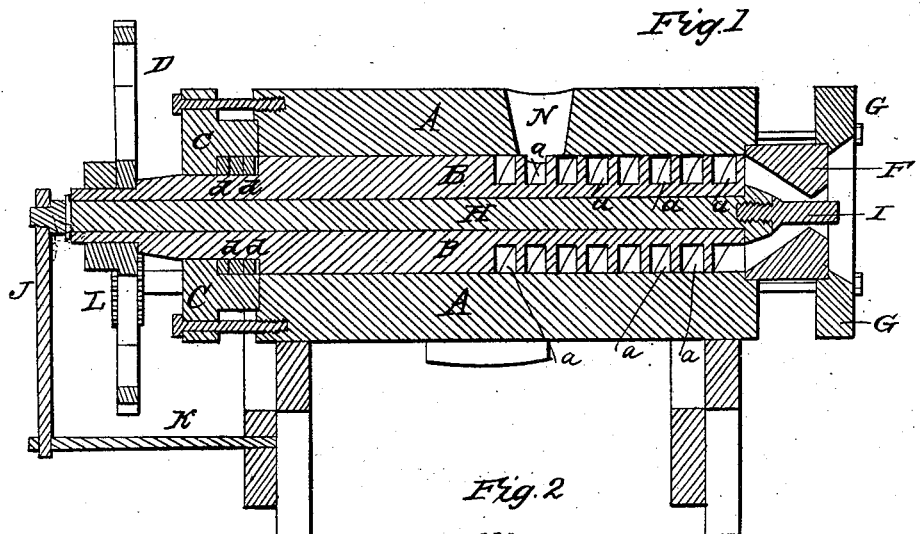
Figure 2:
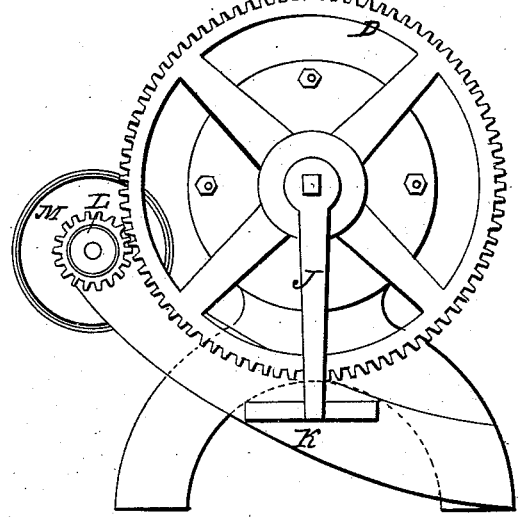

Figure 1, is a vertical longitudinal section, and Fig. 2, is an end elevation.

Similar letters indicate like parts in all the figures.

A, is a hollow iron cylinder, having a turned and polished interior surface, and resting on suitable supports.

B, is a steel tube having polished interior and exterior surfaces, and accurately fitting into the hollow cylinder A. Screw threads *a, a,* are formed on a portion of the periphery of B, commencing at its front end and extending inward for a suitable distance,—as represented in Fig. 1. The portion of B, that projects out of the rear end of the cylinder A, is diminished in size, forming a journal, that passes through and works in the head C,—secured by bolts to the rear end of the cylinder. A recess is formed in the head C, corresponding with the inner diameter of the cylinder, for the reception of the friction rings *d, d,* placed on the diminished portion of B; against which the tube B, reacts while the screw threads on the same are acting upon the metal in forming the pipe, as hereinafter set forth.

Motion is communicated to the tube B, by means of a large toothed wheel (D,) secured to its rear end, which meshes into a pinion (L,) on a driving shaft; or arranged in any other convenient manner.

H, is a steel shaft closely fitting within the tube B, and having a conical head at its front end which fits accurately against the solid annular portion of B, within the screw threads *a, a;* the rear end of H, projects out of the tube B, and has a lever J, attached to it which descends and passes through a mortise or notch in the base piece K, and prevents the shaft from turning.

An aperture N, is formed in the upper side of the cylinder A, opposite the inner ends of the screw threads *a, a,* on B, for the admission of a pipe for conducting the fluid metal from the melting kettle into the grooves between the threads of the screw on B. The metal is kept in a fluid state while it is within the hollow cylinder A, by means of a furnace inclosing the front portion of the same.

A forming die F, is placed over the front end of the hollow cylinder A, and securely fastened to the same by means of the ring G, and the screw bolts as shown in Fig. 1.

A core or mandrel I, is tapped into the conical head of the shaft H, and extends out through the center of the aperture in the die F, in which the pipe is formed.

The operation of my Archimedean pipe machine is as follows: the front portions of the hollow cylinder A, and the tube B, are raised to a sufficiently high temperature to keep the metal in a fluid state after it has been admitted into the cylinder and occupies the spaces between the screw threads on B; motion is then imparted to the tube B, and the fluid metal is permitted to flow into the cylinder A, from a melting kettle constructed in the usual manner. The action of the screw threads *a, a,* carries forward the fluid metal between the same, and discharges it into the constriction chamber within the die F; where it becomes semifluid and is forced, by the continuous action of the screw, out of the aperture in the die, around the core I, into perfectly formed pipe.

By the arrangement and combination of the respective parts of my Archimedean pipe making machine, it will be perceived that I am enabled to dispense with the bridge at the base of the core; and in consequence, the pipe formed by my machine must be more solid and perfect, than that made in machines where the bridge at the base of the core is used. The size of the die and core may be varied to suit the various sizes of pipe that may be required.

Having thus fully described the construction and operation of my Archimedean pipe making machine, what I claim therein as new and desire to secure by Letters Patent, is—

The combination, arrangement, and operation with each other of the hollow cylinder A, the tube B, having a screw formed in a portion of its periphery, the shaft H, the core or mandrel I, and the die F, substantially as herein set forth; not intending to limit myself by this claim to the particular form or number of the parts as herein described and represented, or the material of which they are composed; but to vary them as I may deem expedient while I attain the same end by means substantially the same.

STEPHEN PARKS, Jr.

Witnesses:
Z. C. ROBBINS,
L. WILLIAMS.